Oct. 24, 1944.  W. M. BACON  2,361,004
TELEGRAPH RECORDER CONTROL
Filed Nov. 9, 1943
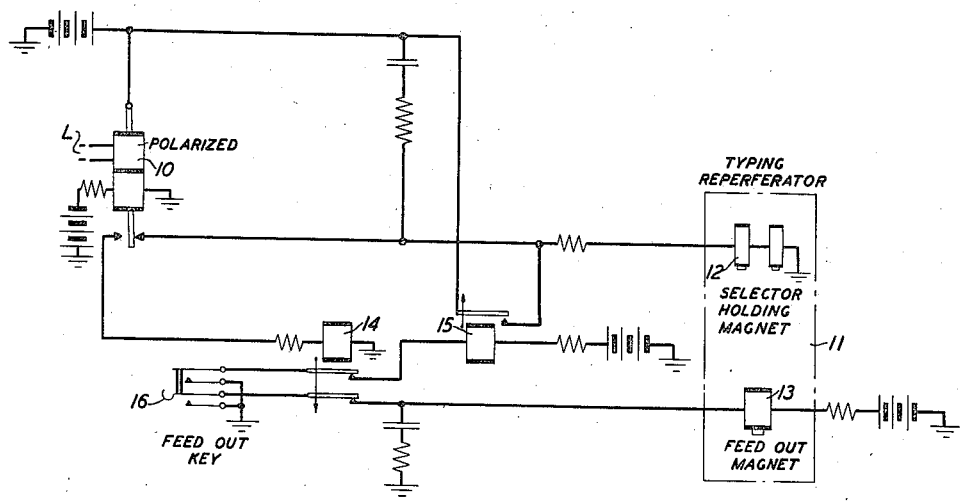
INVENTOR
W.M. BACON
BY William F. Simpson.
ATTORNEY Patented Oct. 24, 1944

2,361,004

UNITED STATES PATENT OFFICE 2,361,004

TELEGRAPH RECORDER CONTROL

Walter M. Bacon, New York, N. Y., assignor to Bell Telephone Laboratories, Incorporated, New York, N. Y., a corporation of New York Application November 9, 1943, Serial No. 509,537

3 Claims. (Cl. 178—92)

This invention relates to telegraph systems and more particularly to improved apparatus and circuits for cooperation with a receiving device or reperforator for causing the receiving device or reperforator to advance a record medium therethrough under control of an operator in the absence of received signals.

A feature of the invention relates to apparatus and circuits for preventing the feed-out mechanism from interfering with the reception and recording of the received signals.

Systems of the prior art have been arranged either to provide no feed-out of the recording medium or to provide feed-out, during each pause in the transmission or reception of signals or else the feed-out is under the control of an operator who interferes with the reception and recording of signals and causes a number of false signals to be recorded.

In an application of Bacon et al., Serial No. 383,490, filed March 15, 1941, a complicated counting arrangement is disclosed for counting four letters characters which must be transmitted before each series of message signals in order to insure that the automatic operation of the recording instrument has been stopped and the recording instrument is in position to properly record received signals. While this counting arrangement operates satisfactorily for letters signals the reception of other signals may cause improper operation of the system.

It is an object of the present invention to provide a feed-out arrangement operated under the control of an operator which will operate properly for any of the signals transmitted preceding the message.

Furthermore, the arrangement employed in the exemplary embodiment of the invention described herein is much simpler and cheaper and only requires three signals preceding each message to insure that the receiving instrument will be properly synchronized with the received signals so that the succeeding signals will be properly recorded thereby. Furthermore, means are provided for insuring that the received signals will be properly recorded and free from interference by accidental or improper operation of the feed-out key by an operator.

Briefly, in accordance with the present invention the time delay device, such as a slow-acting relay, is employed to maintain the controlling or selecting magnet of the receiving device or reperforator operated during the time the feed-out magnet is operated. In other words, the selecting magnet is maintained operated independently of received signals during the time the machine is advancing or feeding out tape under control of the local operator. In addition, the magnet is maintained operated for a short interval of time after the feedout is interrupted either by the operator releasing the key or by the reception of signals.

Inasmuch as it requires approximately three letters signals to release the feed-out magnet and bring the recording instrument to rest in position where it is ready to respond to and properly record the received signals it is desirable to have the time delay device maintain the selecting magnet operated during the reception of at least a major portion of these three characters or code combinations.

The foregoing and other objects and features of this invention, the novel features of which are specifically pointed out in the claims appended hereto, may be more readily understood by reference to the attached drawing which shows an exemplary embodiment of the invention arranged to cooperate with a typing reperforator of the type disclosed in the above-identified application of Bacon et al.

Referring now to the drawing, 11 represents a typing reperforator of the type disclosed in the above-identified application of Bacon et al. This typing reperforator is controlled by the selecting magnet 12 and is also provided with the feed-out magnet 13. The receiving relay 10 follows the signals received over line L and repeats the received signals to the selecting magnet 12 of the typing reperforator. The selecting magnet 12 in turn causes the typing reperforator to both print corresponding characters on a tape and also perforate the tape in accordance therewith. The reperforator causes the tape to be advanced one letter space for each character received during normal operation of the mechanism.

During the reception of signals a circuit is also completed through the spacing contacts of relay 10 for the operation of the slow release relay 14. The relay 14 is sufficiently slow so that it will remain operated during all the marking pulses of signals received over line L and for a short interval of time after signals have been received over line L.

A tape feed-out key 16 is provided to enable the operator to cause the reperforator to advance the tape through the mechanism independently of received signals, that is, when no signals are being received the operator may cause the mechanism to advance the tape through the machine.

In this manner the end of the received message may be advanced out of the machine so that the entire message may be removed from the machine substantially as soon as it is fully received and without waiting for the reception of the beginning of another message.

Assume now for purposes of illustration that no signals are being received and that relay 14 is released. The subsequent operation of key 16 then completes a circuit for the operation of feed-out magnet 13 of the typing reperforator 11. As described in the above-identified application of Bacon et al. the operation of magnet 13 will release the selector cam drum of the reperforator 11 and allow it to rotate independently of the signals or the operation or release of the selector magnet 12. The operation of key 16 also completes a circuit for the operation of relay 15. Relay 15 in operating completes an auxiliary circuit for holding the selecting magnet 12 operated. Thus with the selector magnet 12 operated and the selector cam released the typing reperforator will cause the letters signals to be recorded in the tape by perforation. It is also possible to print a symbol on the tape indicating that the signals perforated therein are letters signals.

Upon the release of the feed-out key 16 the circuit of the feed-out magnet 13 will be interrupted and magnet 13 will release. Then the selector cam drum of the typing reperforator 11 will come to rest and the instrument stop feeding out the tape. At a short interval after key 16 has been released relay 15 will release and remove the short-circuit from around the marking contacts of relay 10. Signals received thereafter over line L will be repeated to the selector magnet 12 in the normal manner and recorded by the recording instrument 11. The above cycle of operation of the typing reperforator may be repeated as often as desired by the operator whenever no signals are being received.

During the time signals are being received relay 14 is operated and maintained operated as described above. Consequently, if key 16 is operated at this time it will be ineffective to cause the operation of either relay 15 of the feed-out magnet 13. Consequently, any inadvertent or improper operation of key 16 during the time signals are being received will not in any way interfere with or affect the reception of the received signals.

If key 16 is operated during the time no signals are being received, as described above, and if while key 16 is maintained operated, signals are received, relay 14 will operate upon the first spacing pulse received and interrupt the circuit of the feed-out magnet 13 and the slow release relay 15. The feed-out magnet 13 will release and cause the selector cam drum of the recorder 11 to come to rest. Relay 15 is a slow release relay and will maintain its contact closed for an appreciable interval of time after relay 14 operates. Consequently, the circuit of the selector magnet 12 is maintained closed at this time so that the magnet will not follow the first signals received from the line L. Inasmuch as a time interval equivalent to the time of three code combinations is required to release magnet 13 and stop the selector cam drum, relay 15 in the exemplary embodiment of the invention described herein should maintain its contacts closed during a time interval substantially equivalent to the time required for the reception of three character code combinations. Inasmuch as contacts of relay 15 maintain the selecting magnet 12 operated, the selector cam drum will not be released by any of the spacing pulses of any of the received signals. Consequently, the signals received during the time contacts of relay 15 are closed do not cause the selector cam drum of typing reperforator 11 to be released for rotation.

At the end of the time interval equal substantially to the time required for the reception of three code combinations, relay 15 will release and remove the short-circuit from around the contact and armature of relay 10 thus permitting relay 10 to repeat the received signals to the selector magnet 12. In this manner, it is possible to reduce the number of all code combinations required to synchronize the typing reperforator 11 from four to three. In addition, an additional factor of safety is secured because with relay 15 maintaining the selector magnet 12 operated, the recording device 11 will be conditioned to accurately receive and record signals independently of the character of the first three code combinations received from line L.

What is claimed is:

1. In combination, a telegraph reperforator for recording signals on a record medium including a control magnet, a circuit for said magnet, apparatus for repeating telegraph signals to said magnet over said circuit for controlling said reperforator in accordance with received signals, auxiliary apparatus for advancing a record medium through said reperforator independent of received signals, and apparatus operative incident to the operation of said auxiliary apparatus for controlling said magnet for an interval of time independently of received signals.

2. In combination, a telegraph receiver for recording messages on a record medium in accordance with received signals, a magnet for controlling said receiver, a circuit therefor, apparatus for repeating signals to said magnet over said circuit, equipment for advancing said record medium through said receiver independently of received signals, a slow release relay operated incident to the operation of said equipment, and circuit connections between said magnet and said slow release relay for maintaining said magnet operated during the time said slow release relay is operated.

3. In combination, a telegraph receiver for recording messages on a record medium in accordance with received signals, a magnet for controlling said receiver, a circuit therefor, apparatus for repeating signals to said magnet over said circuit, equipment for advancing said record medium through said receiver independently of received signals, a slow release relay operated incident to the operation of said equipment, and circuit connections between said magnet and said slow release relay for maintaining said magnet operated during the time said slow release relay is operated and apparatus responsive to received signals for preventing the operation of said equipment.

WALTER M. BACON.